US012805693B2

(12) United States Patent
Lee et al.

(10) Patent No.: US 12,805,693 B2
(45) Date of Patent: Nov. 24, 2026

(54) HOME APPLIANCE

(71) Applicant: LG Electronics Inc., Seoul (KR)

(72) Inventors: Sunghun Lee, Seoul (KR); Byeonghyeon Ju, Seoul (KR); Jintae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 780 days.

(21) Appl. No.: 17/927,293

(22) PCT Filed: Aug. 31, 2020

(86) PCT No.: PCT/KR2020/011605
§ 371 (c)(1),
(2) Date: Nov. 22, 2022

(87) PCT Pub. No.: WO2021/235606
PCT Pub. Date: Nov. 25, 2021

(65) Prior Publication Data

US 2023/0200619 A1 Jun. 29, 2023

(30) Foreign Application Priority Data

May 22, 2020 (KR) ........................ 10-2020-0061792

(51) Int. Cl.
*A47L 15/42* (2006.01)
*E05B 47/00* (2006.01)
*E05B 65/06* (2006.01)

(52) U.S. Cl.
CPC ...... *A47L 15/4259* (2013.01); *E05B 47/0012* (2013.01); *E05B 65/06* (2013.01); *E05B 2047/002* (2013.01)

(58) Field of Classification Search
CPC .................................................... A47L 15/4259
See application file for complete search history.

(56) References Cited

U.S. PATENT DOCUMENTS

2001/0024039 A1* 9/2001 Lippoldt .................. B04B 7/06
292/201
2019/0150701 A1* 5/2019 Chirumbolo ........ A47L 15/4263

FOREIGN PATENT DOCUMENTS

CN 210383839 4/2020
CN 210383839 U * 4/2020
DE 19960809 6/2001
(Continued)

OTHER PUBLICATIONS

CN210383839—Machine Translation (Year: 2020).*
(Continued)

*Primary Examiner* — Benjamin L Utech
(74) *Attorney, Agent, or Firm* — Fish & Richardson P.C.

(57) ABSTRACT

Disclosed is a home appliance comprising: a door; a door lock part which includes a hook portion configured to unlock and open the door when moving outward; a motor which is configured to generate rotational force by using electricity; a gear part which is configured to receive the rotational force from the motor and rotate by the rotational force; and a driving gear part which includes a toothed portion formed to be engaged with the gear part, is configured to receive the rotational force from the gear part by the toothed portion and rotate by the rotational force, and is configured to push the hook portion out of the door lock part to open the door when rotating in one direction.

13 Claims, 10 Drawing Sheets

(56) References Cited

FOREIGN PATENT DOCUMENTS

| | | | | |
|---|---|---|---|---|
| EP | 1433893 | A2 | 6/2004 | |
| EP | 2846676 | A2 | 3/2015 | |
| JP | H09-217527 | A | 8/1997 | |
| KR | 20190024617 | | 3/2019 | |
| KR | 20190120726 | | 10/2019 | |
| WO | WO-2013167490 | A2 * | 11/2013 | ......... A47L 15/4261 |
| WO | WO 2020010482 | A1 | 1/2020 | |

OTHER PUBLICATIONS

WO2013167490—Machine Translation (Year: 2013).*
Extended European Search Report in European Appln. No. 20936163.3, mailed on Jun. 24, 2024, 10 pages.

* cited by examiner

HOME APPLIANCE

CROSS-REFERENCE TO RELATED APPLICATIONS

This application is a National Stage application under 35 U.S.C. § 371 of International Application No. PCT/KR2020/011605, filed on Aug. 31, 2020, which claims the benefit of Korean Application No. 10-2020-0061792, filed on May 22, 2020. The disclosures of the prior applications are incorporated by reference in their entirety.

TECHNICAL FIELD

The present disclosure relates to a home appliance having a door, such as a dishwasher.

BACKGROUND ART

Among home appliances, there are appliances having a door. For example, a home appliance having a door may include a dishwasher, an oven, a microwave range, and the like.

Meanwhile, a dishwasher is an appliance that washes dishes. A washing tank for washing dishes is provided inside a main body of the dishwasher.

The dishwasher generally includes a door coupled to a main body of the dishwasher to open and close the washing tank, and a locking device that locks the door to maintain a closed state of the door or unlocks the door.

Prior Patent Document EP 2 846 676 A2 (published on Mar. 18, 2015) discloses a home appliance having a door, such as a dishwasher. In the dishwasher of the prior patent document, there is disclosed a configuration of a door, and a locking device that locks the door and releases a locked state of the door.

The locking device of the prior patent document is configured to wind and pull a flexible element using a rotational force of an electric motor, and release a locked state of the door by moving a locking element in a latched state to the door in one direction as a transmission lever constituting one body with the flexible element rotates in one direction during the operation of the electric motor.

However, in the case of the locking device of the prior patent document, since it should be processed to have a thin thickness in order to secure an elasticity of the flexible element, the processing of the flexible element is somewhat difficult, and there is a risk that part of the flexible element may be cut off due to an impact. Furthermore, in order to form the transmission lever and the flexible element into a single body, the transmission lever and the flexible element must be individually processed and then joined together.

In addition, in a state in which the flexible element is wound by the rotational force of the electric motor, there is a force to unwind the flexible element again, so that some loss occurs in the rotational force of the electric motor acting on the flexible element.

DISCLOSURE OF INVENTION

Technical Problem

An aspect of the present disclosure is to provide a home appliance having a locking device that unlocks a door using a rotational force of an electric motor, in which the configuration of the locking device associated with transmitting a rotational force of the electric motor is made simpler.

Another aspect of the present disclosure is to provide a home appliance having a structure capable of minimizing loss in the process of transmitting the rotational force of the electric motor.

Solution to Problem

In order to achieve the objectives of the present disclosure, a home appliance according to an embodiment of the present disclosure may include a door; a door lock portion provided with a hook portion configured to unlock the door to open the door when moving out thereof; an electric motor configured to generate a rotational force using electricity; a gear portion configured to rotate by receiving the rotational force from the electric motor; and a drive gear portion provided with a toothed portion disposed to engage with the gear portion to rotate by receiving the rotational force from the gear portion by the toothed portion, and push the hook portion out of the door lock portion to open the door when rotating in one direction.

According to an example associated with the present disclosure, the drive gear portion may include a first section provided with the toothed portion; and a second section rotatably coupled to the first section, and disposed between the first section and the hook portion to push the hook portion out of the door lock portion when the first section rotates in one direction.

According to an example associated with the present disclosure, the toothed portion may be provided on one side of the first section, and a rotation axis of the drive gear portion may be disposed on the other side of the first section.

According to an example associated with the present disclosure, the second section may be disposed adjacent to the rotation axis of the drive gear portion.

According to an example associated with the present disclosure, the first section may be provided with a curved surface portion provided on one side of the first section and configured with a curved surface, and the toothed portion may be disposed on the curved surface portion.

According to an example associated with the present disclosure, the curved surface portion may be disposed in a convex manner in a direction away from the rotation axis of the drive gear portion.

According to an example associated with the present disclosure, the curved surface portion may be disposed in a concave manner toward the rotation axis of the drive gear portion.

According to an example associated with the present disclosure, the gear portion may be configured to have a smaller number of output rotations than that of input rotations to reduce a rotational speed of a shaft constituting the rotation axis of the electric motor.

According to an example associated with the present disclosure, the gear portion may include a first gear coupled to the shaft; a second gear disposed to engage with the first gear, and configured to have a rotation axis crossing the rotation axis of the electric motor; and a third gear coupled to the second gear to rotate together with the second gear, configured to have the same rotation axis as the second gear, and disposed to engage with the toothed portion.

According to an example associated with the present disclosure, a number of rotations of the drive gear portion may be configured to be smaller than that of rotations of the third gear.

According to an example associated with the present disclosure, the home appliance may further include a housing portion that accommodates the drive gear portion, wherein the housing portion is provided with a stopper disposed in contact with part of the drive gear portion on a path where the drive gear portion rotates to limit a rotational operation of the drive gear portion to a preset position.

According to an example associated with the present disclosure, the hook portion may be provided with a hook engaging portion provided at one end portion thereof, wherein the door is provided with a door engaging portion engaged with the hook engaging portion, and the door lock portion further includes an elastic portion having one end portion thereof disposed in contact with the second section, and caught by the other end portion of the hook portion to elastically pressurize the hook portion into the door lock portion; and a support portion disposed in contact with the other end portion of the elastic portion to support the other end portion of the elastic portion.

According to an example associated with the present disclosure, the hook portion and the second section may be provided with a first contact surface and a second contact surface, respectively, which are disposed in contact with each other when the second section moves out of the door lock portion, wherein in a state prior to being pushed out of the door lock portion by the second section, one end portion of the hook portion is configured to face lower than the other end portion, and the first and second contact surfaces are disposed to have an included angle having a predetermined value in a state before the second section moves out of the door lock portion, and one end portion of the hook portion is configured to rotate upward about the other end portion of the hook portion when the second section moves out of the door lock portion.

According to an example associated with the present disclosure, the home appliance may further include a controller configured to control an operation of the electric motor; and a sensing portion configured to detect a movement of the drive gear portion rotating in the other direction, wherein when the sensing portion detects a movement of the drive gear portion rotating in the other direction, the controller is configured to operate the electric motor.

According to an example associated with the present disclosure, the door may be rotatably coupled to a main body having an opening portion on one side thereof to open and close the opening portion, and the door lock portion may be provided in the main body.

According to an example associated with the present disclosure, the door may be rotatably coupled to a main body having an opening portion on one side thereof to open and close the opening portion, and the door lock portion may be provided in the door.

Advantageous Effects of Invention

The effects of the present disclosure obtained through the foregoing solutions are as follows.

The home appliance includes a drive gear portion configured to open a door by pushing a hook portion out of a door lock portion when rotating in one direction. Here, the drive gear portion is provided with a toothed portion disposed to directly engage with a gear portion that rotates by receiving a rotational force from the electric motor, and configured to rotate by receiving the rotational force of the electric motor from the gear portion.

According to the configuration of the home appliance as described above, a configuration of the drive gear portion, which is configured to open the door by pushing the hook portion of the door lock portion due to a movement that rotates by receiving a rotational force generated from the electric motor may be made simple, thereby further facilitating the processing of the drive gear portion as well as reducing a material cost required for the processing of the drive gear portion. Furthermore, due to a simple structure of the drive gear portion, the possibility that part of the drive gear portion is cut due to an impact or the like may be greatly reduced, thereby further improving the reliability of the operation of the drive gear portion.

In addition, the toothed portion of the drive gear portion may be configured to rotate in direct engagement with the gear portion transmitting the rotational force of the electric motor, thereby greatly increasing the transmission efficiency of the rotational force generated in the electric motor.

MODE FOR THE INVENTION

Hereinafter, a home appliance 100 associated with the present disclosure will be described in detail with reference to the accompanying drawings.

According to the present specification, the same or similar elements are designated with the same numeral references even in different embodiments and their redundant description will be omitted.

A singular representation may include a plural representation as far as it represents a definitely different meaning from the context.

Figure 1:
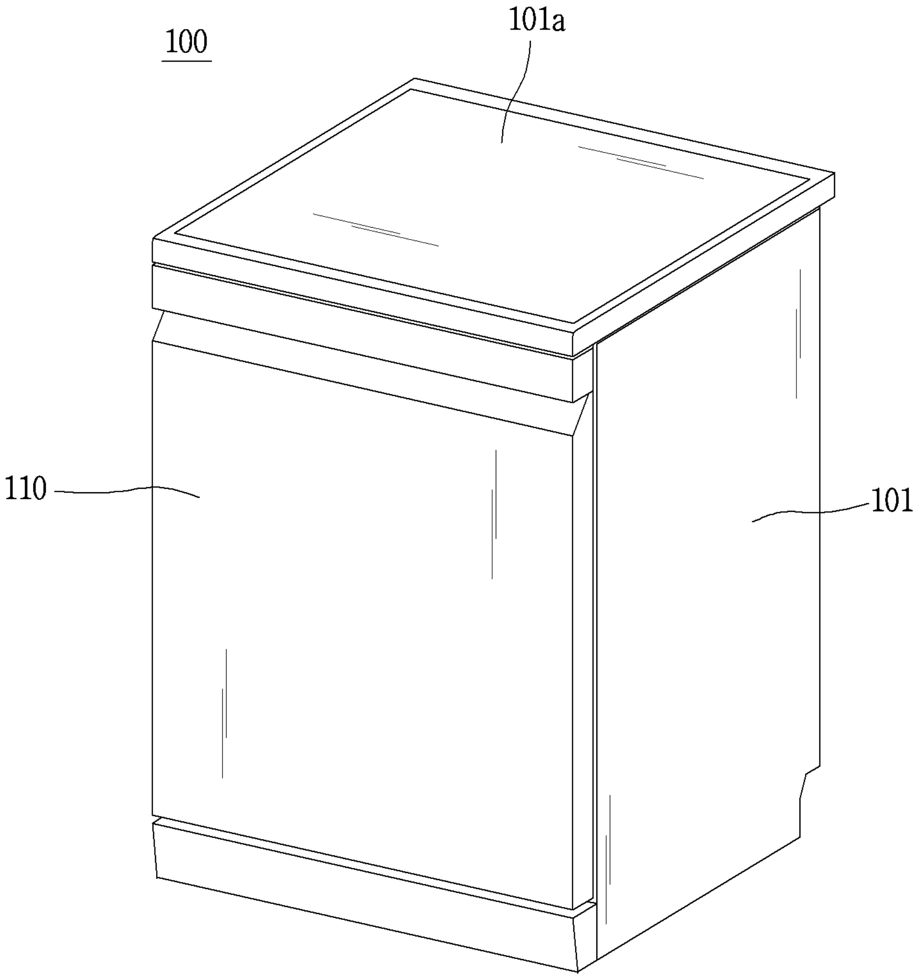
FIG. 1 is a perspective view showing a home appliance according to an embodiment of the present disclosure.
Figure 2:
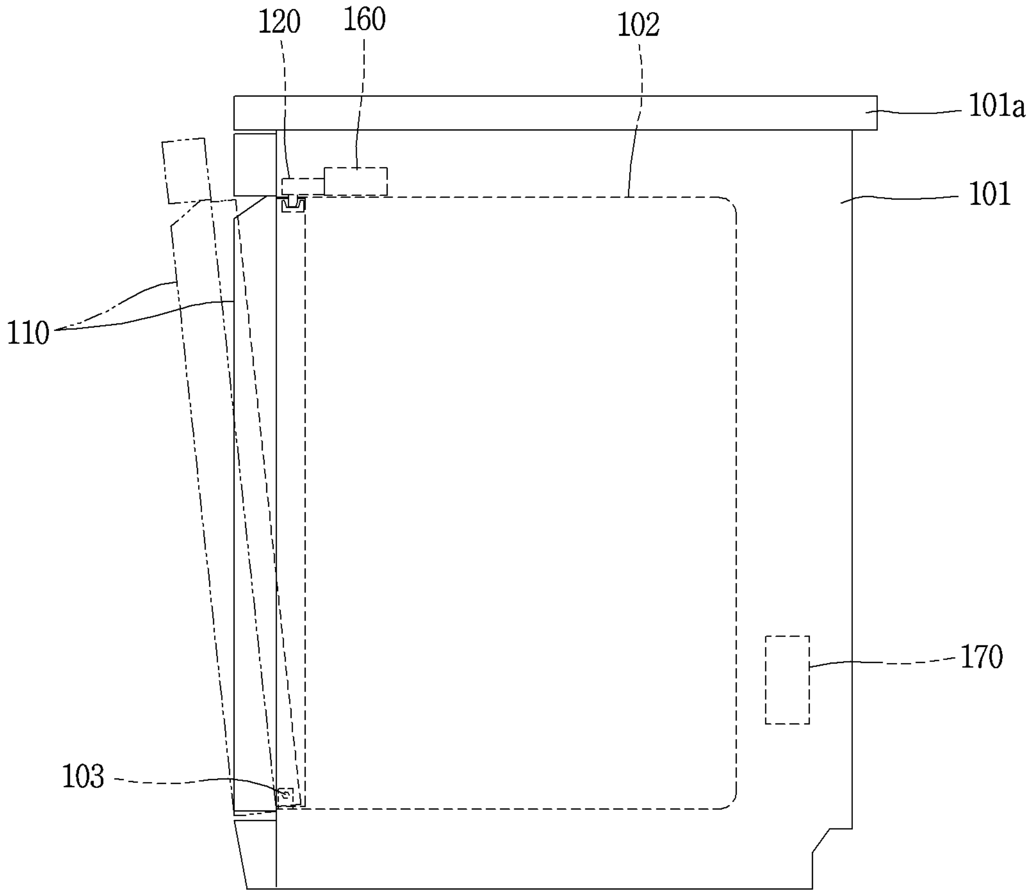
FIG. 2 is a view conceptually showing a lateral side of the home appliance illustrated in FIG. 1.
Figure 3:
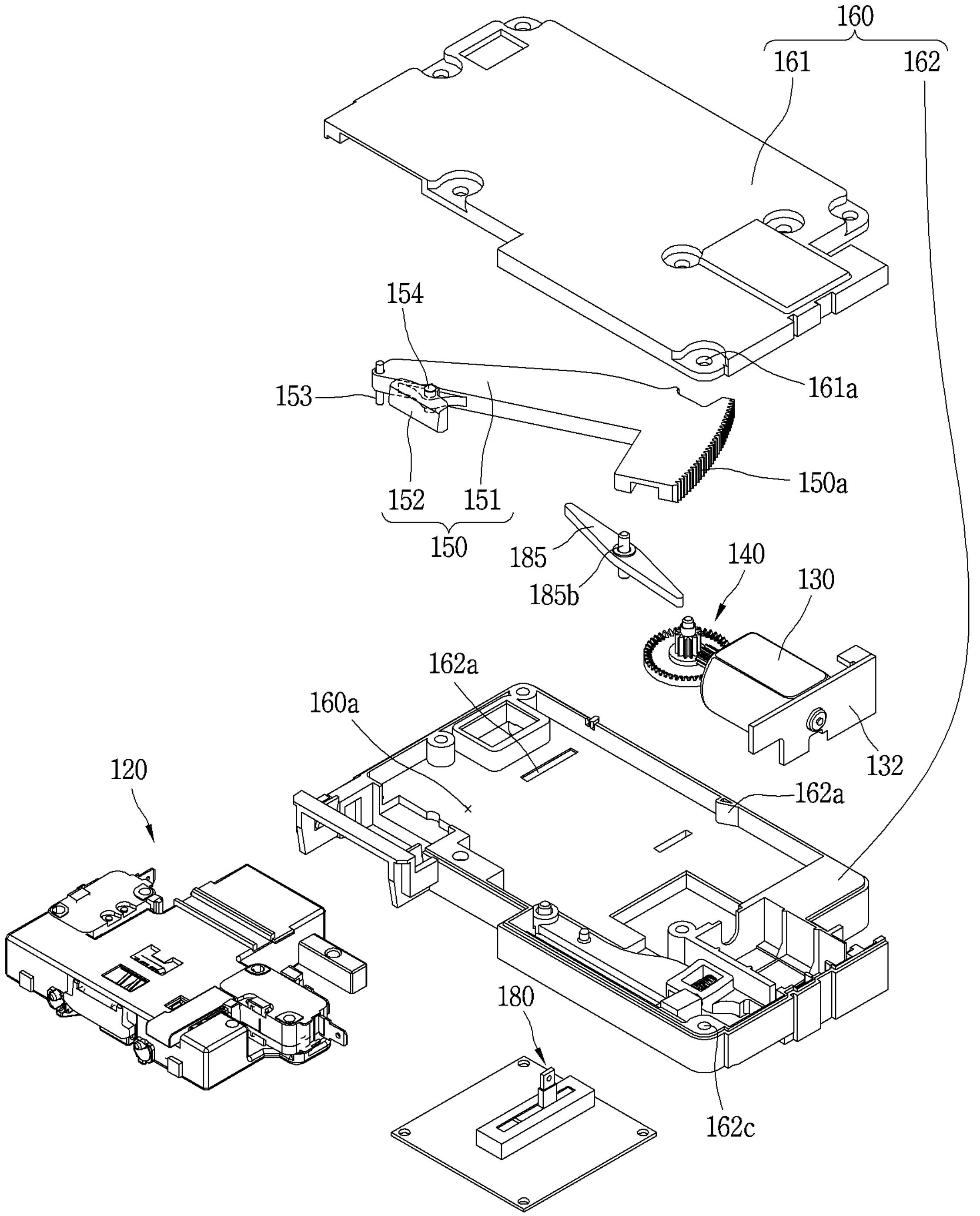
FIG. 3 is an exploded perspective view showing a shape of a door lock portion and components that operate the door lock portion illustrated in FIG. 2.
Figure 4:
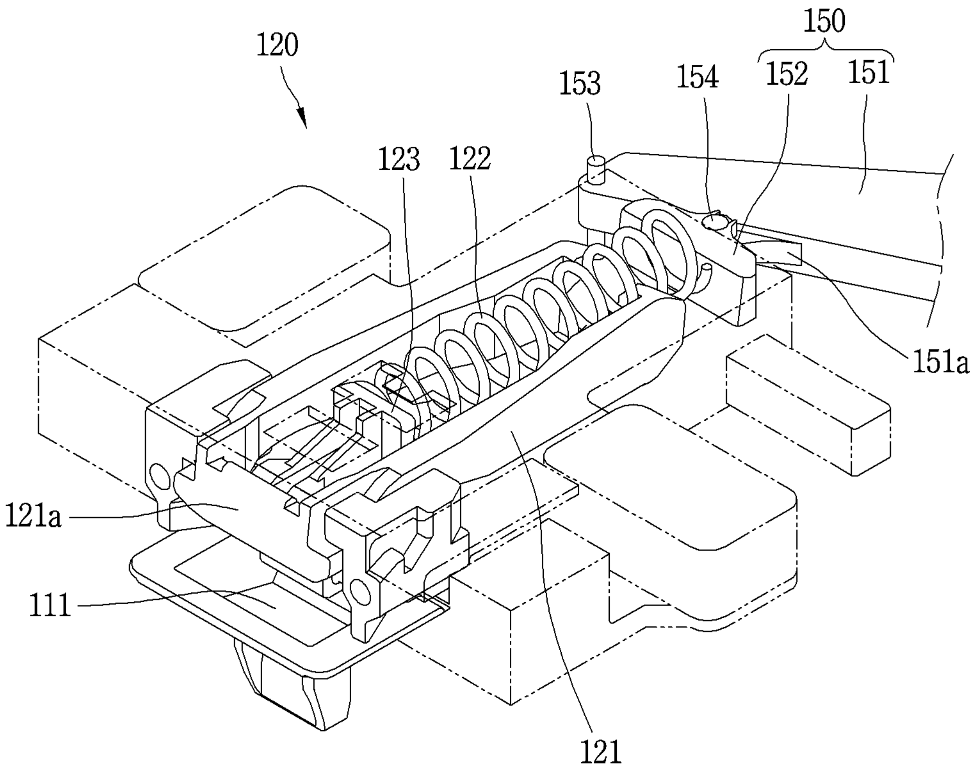
FIG. 4 is a perspective view conceptually showing an inner shape of the door lock portion illustrated in FIG. 3.
Figure 5:
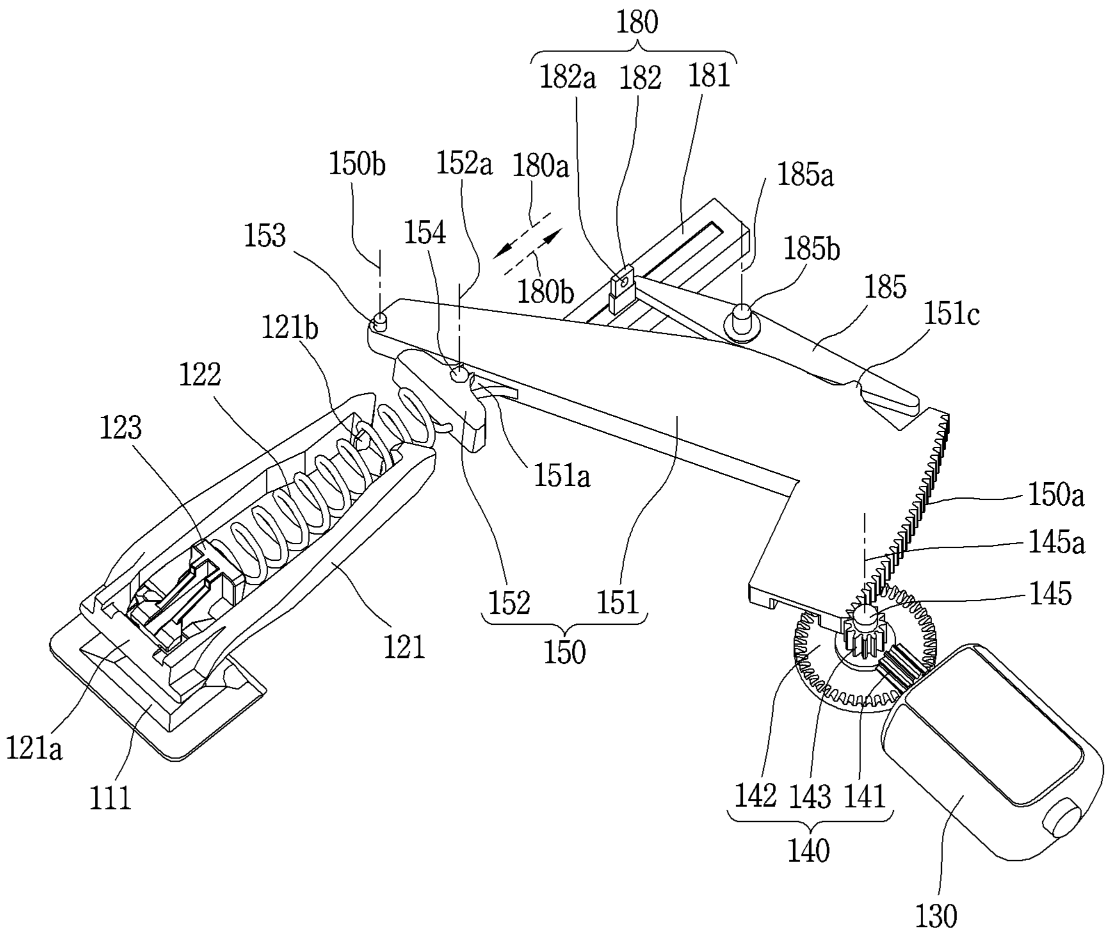
FIG. 5 is a perspective view showing a shape in which components configured to open a door by pushing a hook portion of the door lock portion illustrated in FIG. 3 out of the door lock portion are assembled around a drive gear portion.
Figure 6:
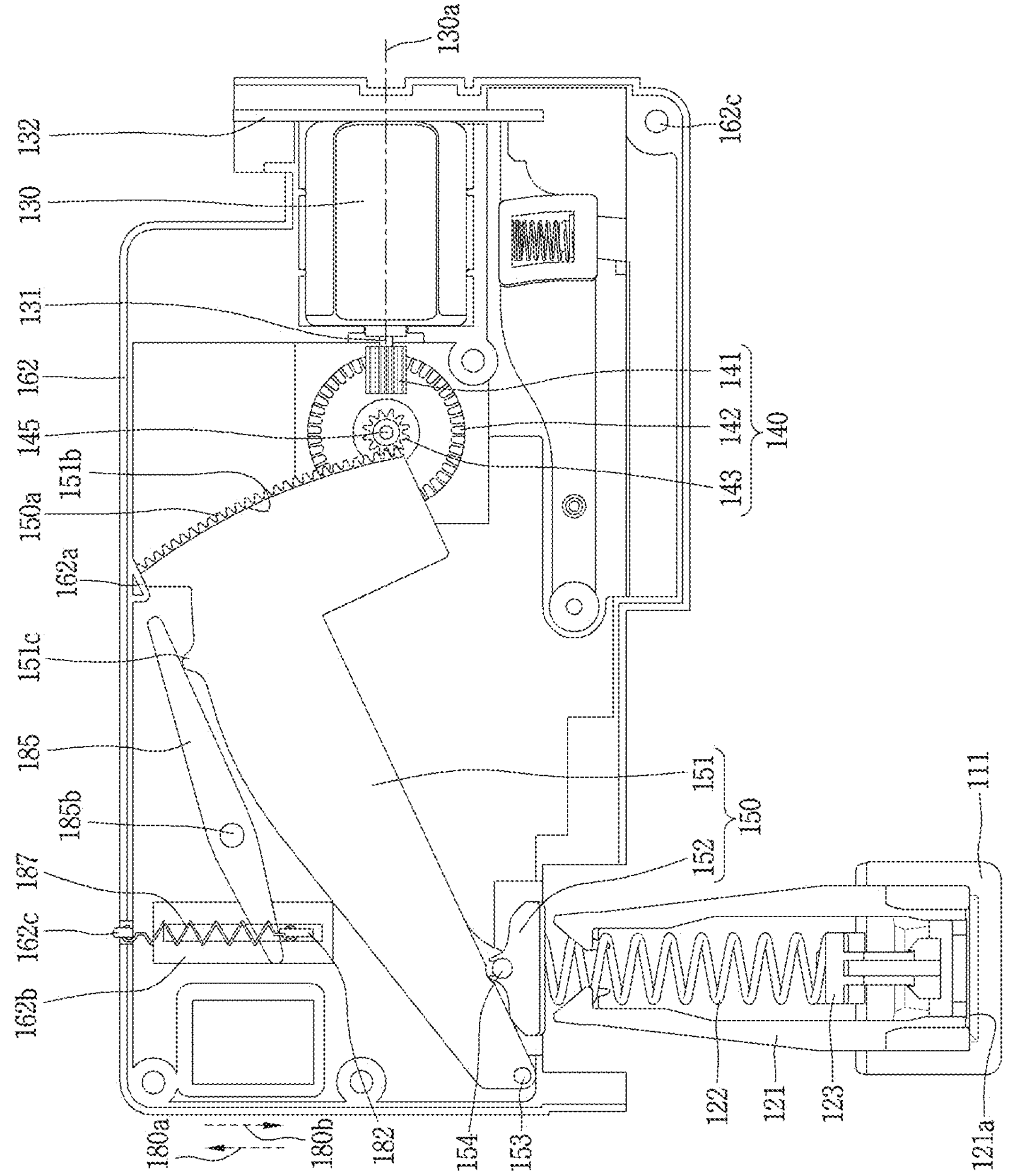
FIG. 6 is a view conceptually showing a shape in which the door is locked prior to rotating the drive gear portion illustrated in FIG. 5.
Figure 7:
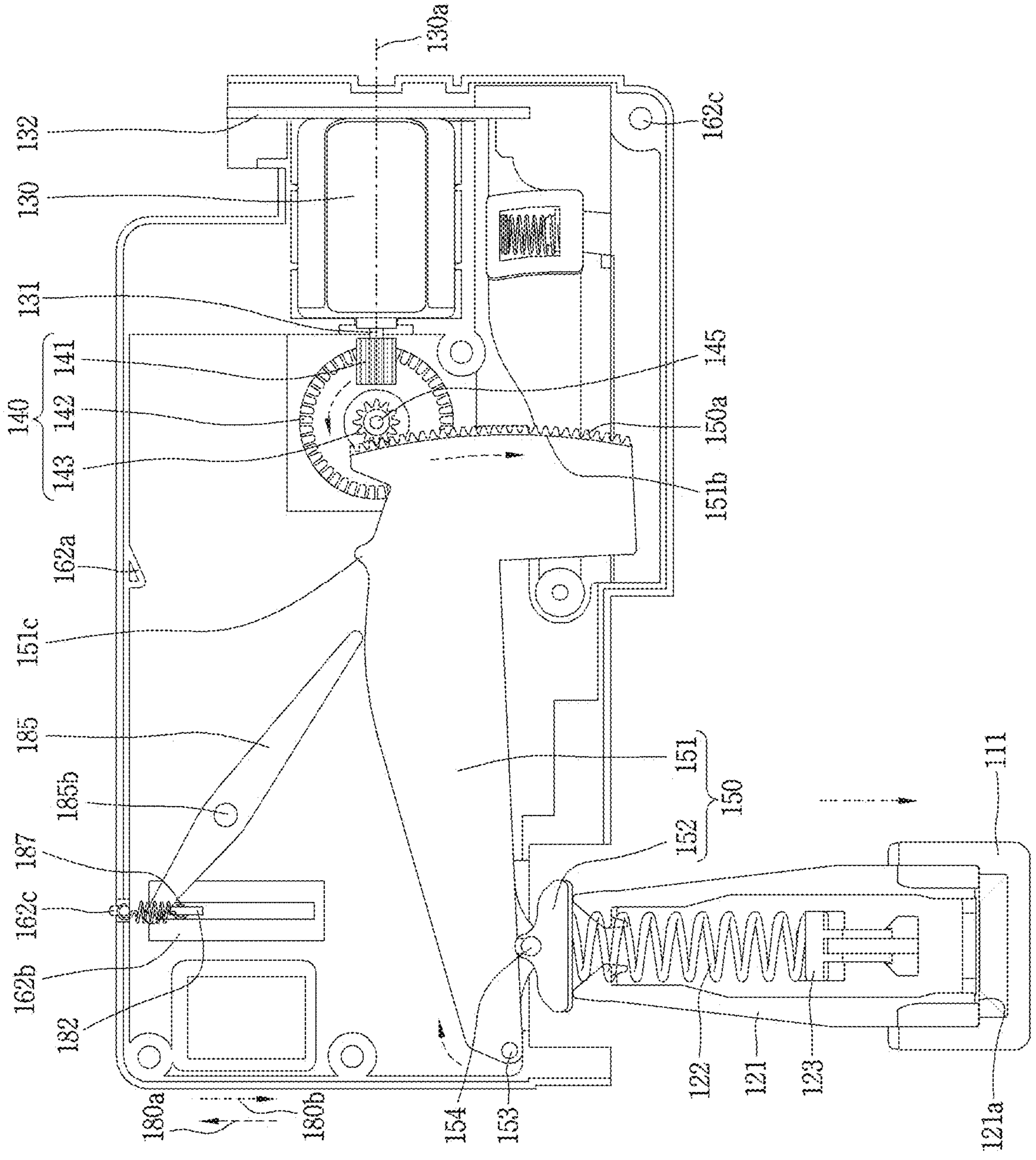
FIG. 7 is a view conceptually showing a shape in which the drive gear portion illustrated in FIG. 6 rotates to release a locked state of the door.

FIG. 1 is a perspective view showing the home appliance 100 according to an embodiment of the present disclosure, FIG. 2 is a view conceptually showing a lateral side of the home appliance 100 illustrated in FIG. 1, FIG. 3 is an exploded perspective view showing a shape of a door lock portion 120 and components that operate the door lock portion 120 illustrated in FIG. 2, FIG. 4 is a perspective view conceptually showing an inner shape of the door lock portion 120 illustrated in FIG. 3, FIG. 5 is a perspective view showing a shape in which components configured to open a door 110 by pushing a hook portion 121 of the door lock portion 120 illustrated in FIG. 3 out of the door lock portion 120 are assembled around a drive gear portion 150, FIG. 6 is a view conceptually showing a shape in which the door 110 is locked prior to rotating the drive gear portion 150 illustrated in FIG. 5, and FIG. 7 is a view conceptually showing a shape in which the drive gear portion 150 illustrated in FIG. 6 rotates to release a locked state of the door 110.

Referring to FIGS. 1 to 7, the home appliance 100 includes a door 110, a door lock portion 120, an electric motor 130, a gear portion 140, and a drive gear portion 150.

The home appliance 100 refers to an appliance that is mainly used at home. In particular, the home appliance 100 of the present disclosure may include a dishwasher, an oven, and a microwave range, which are provided with the door 110.

In this specification, the dishwasher will be described as an example among the home appliances 100 having the door 110. A washing tank 102 that washes dishes may be provided inside a main body 101 of the home appliance 100. The main body 101 may have an opening portion provided on one side thereof. In the drawings of the present disclosure, it is shown a shape in which the opening portion is disposed in front of the main body 101. The opening portion may constitute an inlet port of the washing tank 102. A shelf (not shown) on which dishes can be mounted may be disposed inside the washing tank 102. Furthermore, an upper plate 101*a* disposed to cover an upper side of the main body 101 may be disposed on an upper surface of the main body 101.

The door 110 may be rotatably coupled to the main body 101 to open and close the opening portion. For example, as illustrated in FIGS. 1 and 2, the door 110 may be disposed in front of the main body 101 to open and close the opening portion. The home appliance 100 may include a hinge portion 103 allowing the door 110 to be rotatably coupled to the main body 101. Referring to FIGS. 1 and 2, the hinge portion 103 may be configured to couple a lower end portion of the door 110 to the main body 101. Accordingly, as an upper end portion of the door 110 is rotated in a forward direction of the main body 101 about the hinge portion 103, the opening portion may be opened. Meanwhile, the opening portion and the door 110 may be disposed on the other side of the main body 101 instead of the front of the main body 101.

The door 110 may include a door engaging portion 111 disposed to be caught by a hook engaging portion 121*a* to be described later.

The door lock portion 120 is configured to maintain a closed state of the door 110 or release a locked state of the door 110. The door lock portion 120 may include a hook portion 121 configured to lock the door 110 or unlock the door 110. The door lock portion 120 may be provided in the main body 101 as illustrated in FIG. 2. Furthermore, although not illustrated in the drawings of the present disclosure, the door lock portion 120 may be provided in the door 110. When an upper end portion of the door 110 rotates toward a front side of the main body 101 around the hinge portion 103 due to the weight of the door 110 while unlocking the door 110, the door 110 will be opened.

The hook portion 121 is configured to unlock the door 110 when moving out of the door lock portion 120 to open the door 110. Conversely, the hook portion 121 locks the door 110 when moving into the door lock portion 120 to maintain a closed state of the door 110. The hook portion 121 may include the hook engaging portion 121*a* provided at one end. The hook engaging portion 121*a* may be disposed to be caught by the door engaging portion 111 provided in the door 110.

The electric motor 130 is configured to generate a rotational force using electricity. A substrate 132 disposed with an electric circuit may be disposed on one side of the electric motor 130. The electric motor 130 may be configured to be electrically connected to the substrate 132. The electric motor 130 may include a shaft 131 that constitutes a rotation axis 130*a* of the electric motor 130.

Meanwhile, the home appliance 100 may further include a controller 170 configured to control an operation of the electric motor 130. The controller 170 may be configured to perform overall control related to a manipulation of the home appliance 100 as well as the control of the electric motor 130. The controller 170 may be configured to selectively control the operation of the electric motor 130 according to an operating state of the home appliance 100. For example, when a specific operation process of the home appliance 100 is terminated, the controller 170 may operate the electric motor 130 to open the door 110.

The gear portion 140 may be configured to rotate by receiving a rotational force from the electric motor 130. The gear portion 140 may be configured to have a smaller number of output rotations than that of input rotations to reduce a rotational speed of the shaft 131. According to the configuration of the gear portion 140 as described above, the rotational speed of the shaft 131 is decreased while the rotational force of the electric motor 130 is increased while being transmitted through the gear portion 140. At least a part of the gear portion 140 may be made of a polyacetal material.

For example, the gear portion 140 may include a first gear 141, a second gear 142, and a third gear 143.

The first gear 141 may be coupled to the shaft 131 of the electric motor 130 to rotate together with the shaft 131 about the rotation axis 130*a* of the electric motor 130. For deceleration of the electric motor 130, the number of teeth of the first gear 141 may be smaller than that of teeth of the second gear 142 to be described later.

The second gear 142 may be disposed to engage with the first gear 141, and configured to have a rotation axis 145*a* intersecting the rotation axis 130*a* of the electric motor 130. The gear portion 140 may include a gear shaft 145 constituting the rotation axis 145*a* of the second gear 142 and the rotation axis 145*a* of a third gear 143 to be described later. The gear shaft 145 may be disposed to protrude on one surface of the second gear 142. The first and second gears 141, 142 may be configured to form the same rotational direction. For example, when the first gear 141 rotates clockwise, the second gear 142 may also be configured to rotate clockwise, and when the first gear 141 rotates counterclockwise, the second gear 142 may also be configured to rotate counterclockwise.

The third gear 143 may be configured to be coupled to the second gear 142 to rotate together with the second gear 142. For example, the third gear 143 may be coupled to the gear shaft 145 disposed on one surface of the second gear 142. The third gear 143 may constitute the same rotation axis 145*a* about the second gear 142 and the gear shaft 145. Furthermore, the number of teeth of the third gear 143 may be configured to be smaller than that of teeth of the second gear 142.

Furthermore, the third gear 143 rotating together with the second gear 142 may be configured to engage with the toothed portion 150*a* provided in the drive gear portion 150 to be described later to transmit the rotational force of the electric motor 130 to the drive gear portion 150. Here, the number of rotations of the drive gear portion 150 may be smaller than that of rotations of the third gear 143. Accordingly, the rotational force of the electric motor 130 is increased while being transmitted from the third gear 143 to the drive gear portion 150. The third gear and the drive gear portion 150 may be configured to form opposite rotational directions. For example, when the third gear 143 rotates clockwise, the drive gear portion 150 may be configured to rotate counterclockwise, and when the third gear 143 rotates counterclockwise, the drive gear portion 150 may be configured to rotate clockwise.

The drive gear portion 150 includes a toothed portion 150*a* disposed to engage with the gear portion 140. That is, the toothed portion 150*a* of the drive gear portion 150 is configured to directly engage with the gear portion 140 so as to directly receive the rotational force transmitted from the electric motor 130 to the gear portion 140. At least part of the drive gear portion 150 may be made of a polyacetal material.

The drive gear portion 150 may be configured to rotate by receiving a rotational force of the electric motor 130 from the gear portion 140 by the toothed portion 150*a*, and may be configured to open the door 110 by pushing the hook portion 121 of the door lock portion 120 out of the door lock portion 120 when rotating in one direction. For example, the drive gear portion 150 may be configured to push the hook portion 121 out of the door lock portion 120 when rotating clockwise. The drive gear portion 150 is configured to be rotatable in one direction or the other direction.

Meanwhile, the home appliance 100 may further include a housing portion 160 accommodating the drive gear portion 150. The housing portion 160 may include an accommodation space 160*a* disposed to accommodate the drive gear portion 150. The accommodation space 160*a* may be disposed to accommodate the electric motor 130 and the gear portion 140 in addition to the drive gear portion 150. The housing portion 160 may include a first cover 161 and a second cover 162 that are coupled to each other to constitute the accommodation space 160*a*. The first cover 161 and the second cover 162 may be provided with a first fastening hole 161*a* and a second fastening hole 162*c*, respectively, which are configured to assemble a fastening member (not shown) for fastening the first and second covers 161, 162.

Furthermore, the housing portion 160 may include a stopper 162*a*.

The stopper 162*a* may be configured to be in contact with part of the drive gear portion 150 on a path where the drive gear portion 150 rotates, thereby limiting a rotational operation of the drive gear portion 150 to a preset position. According to the configuration of the stopper 162*a*, even when the electric motor 130 malfunctions, the rotation of the drive gear portion 150 may be stably operated within a range of the designed rotation path.

Meanwhile, the drive gear portion 150 may include a first section 151 and a second section 152.

The first section 151 is configured to be provided with the toothed portion 150*a* disposed to engage with the gear portion 140.

The second section 152 may be configured to be rotatably coupled to the first section 151, and disposed between the first section 151 and the hook portion 121 to push the hook portion 121 out of the door lock portion 120 when the first section 151 rotates in one direction.

The drive gear portion 150 may include a connection pin 154 that rotatably couples the second section 152 to the first section 151. The connection pin 154 may be coupled to a rib 151*a* provided on the first section 151 as illustrated in FIG. 5. The connection pin 154 may be configured such that the second section 152 constitutes a rotation axis 150*b*.

Meanwhile, the toothed portion 150*a* may be provided on one side of the first section 151 of the drive gear portion 150. In addition, the rotation axis 150*b* of the drive gear portion 150 engaged with the gear portion 140 by the toothed portion 150*a* may be disposed on the other side of the first section 151. The drive gear portion 150 may include a shaft portion 153 provided on the other side of the drive gear portion 150 to constitute a rotation axis 150*b* of the drive gear portion 150. The shaft portion 153 may be configured to be fixed to the housing portion 160 accommodating the drive gear portion 150.

Here, the second section 152 of the drive gear portion 150 may be disposed adjacent to the rotation axis 150*b* of the drive gear portion 150. According to the configuration of the second section 152 as described above, a greater force may be applied to the second section 152 when the drive gear portion 150 is rotated due to a lever structure to further improve the efficiency of the electric motor 130.

Meanwhile, the first section 151 of the drive gear portion 150 may include a curved surface portion 151*b* provided on one side of the first section 151 as illustrated in FIGS. 6 and 7 and configured with a curved surface. Here, the toothed portion 150*a* may be disposed on the curved surface portion 151*b*. For example, the curved surface portion 151*b* may be disposed in a convex manner in a direction away from the rotation axis 150*b* of the drive gear portion 150. According to the structure of the toothed portion 150*a* as described above, a gear ratio of the toothed portion 150*a* and the gear portion 140 may be further increased to increase the rotational force of the electric motor 130 transmitted to the drive gear portion 150. The gear ratio may be defined as a value obtained by dividing the number of teeth of a large gear by the number of teeth of a small gear.

Meanwhile, the door lock portion 120 may further include an elastic portion 122 and a support portion 123.

The elastic portion 122 may be configured such that one end portion thereof is disposed in contact with the second section 152 of the drive gear portion 150, and caught by the other end portion of the hook portion 121 to pressurize the hook portion 121 into the door lock portion 120. An engaging protrusion portion 121*b* engaged with part of the elastic portion 122 may be provided at the other end of the hook portion 121.

At least part of the elastic portion 122 may be configured to have, for example, a spring structure. The elastic portion 122 may be configured such that an elastic force acts in an extending direction.

The support portion 123 may be disposed in contact with the other end portion of the elastic portion 122. Furthermore, the support portion 123 may be configured to support the other end portion of the elastic portion 122. The support portion 123 may be disposed in a fixed state regardless of the movement of the hook portion 121 on the door lock portion 120.

A more detailed structure related to the operation of the door lock portion 120 will be described later with reference to FIGS. 9 and 10.

Meanwhile, the home appliance 100 may further include a sensing portion 180.

The sensing portion 180 may be configured to detect a movement of the drive gear portion 150 rotating in the other direction. The sensing portion 180 may include a sensor housing 181 and a sensor 182 configured to move along one direction on the sensor housing 181. The sensor 182 may move along a first direction 180*a* or a second direction 180*b* opposite to the first direction 180*a* on the sensor housing 181. The first direction 180*a* and the second direction 180*b* may be defined to lie on one straight line. An engaging hole 182*a* may be disposed in the sensor 182. The sensing portion 180 may be assembled from a bottom surface of the second cover 162 of the housing portion 160. In addition, the second cover 162 may be provided with a through hole 162*b* providing a space through which the sensor 182 passes through the bottom surface of the second cover 162 to protrude toward an upper surface of the second cover 162.

The sensing portion 180 may include a spring 187 having one end portion connected to the engaging hole 182*a* and the other end portion connected to a ring portion 162*c* provided on the second cover 162 of the housing portion 160. The spring 187 may be configured such that an elastic force acts in a decreasing direction. That is, the spring 187 is configured to move the sensor 182 moving along one direction on the sensor housing 181 toward the ring portion 162*c* of the second cover 162.

In addition, the sensing portion 180 may include a lever portion 185 that transmits a movement generated during the rotational operation of the drive gear portion 150 to the sensing portion 180.

The lever portion 185 may be configured such that one end thereof is disposed between the sensor 182 and the ring portion 162*c*, and the other end thereof is disposed in contact with part of the drive gear portion 150 on a rotation path of the drive gear portion 150, and disposed to constitute a rotation axis 185*a* about a lever shaft portion 185*b*. A protrusion portion 151*c* protruding from the first section 151 to be in contact with the other end portion of the lever portion 185 may be provided at a section of the drive gear portion 150 in contact with the other end portion of the lever portion 185.

According to the configuration of the sensing portion 180 and the lever portion 185 as described above, one end portion and the other end portion of the lever portion 185 may be configured to always maintain a state in contact with the sensor 182 and the drive gear portion 150, respectively. In addition, when a movement occurs according to the rotational operation of the drive gear portion 150, the sensor 182 may be configured to sense a rotational movement of the drive gear portion 150 as the sensor 182 moves on the sensor housing 181.

Here, the controller 170 of the home appliance 100 may be configured to operate the electric motor 130 when the sensing portion 180 detects a movement of the drive gear portion 150 rotating in the other direction. According to the configuration of the home appliance 100 as described above, when a movement of the hook portion 121 moving into the door lock portion 120 occurs, a movement occurs in which the second section 152 of the drive gear portion 150 facing the other end portion of the hook portion 121 moves into the door lock portion 120. Furthermore, when the second section 152 moves into the door lock portion 120, a movement occurs in which the first section 151 rotatably coupled to the second section 152 rotates in the other direction opposite to one direction rotating when the electric motor 130 operates.

According to the configuration of the home appliance 100 as described above, for example, when a force that pushes the door 110 toward the body 101 is applied by a user of the home appliance 100, the sensing portion 180 may detect the movement of the door 110. Then, the controller 170 may detect the movement of the door 110 to operate the electric motor 130 so as to operate the door lock portion 120, thereby implementing an operation in which the door 110 is automatically opened according to the movement of the door 110.

Hereinafter, another example of the drive gear portion 150 illustrated in FIG. 5 will be further described with reference to FIG. 8 together with FIGS. 1 to 7.

Figure 8:
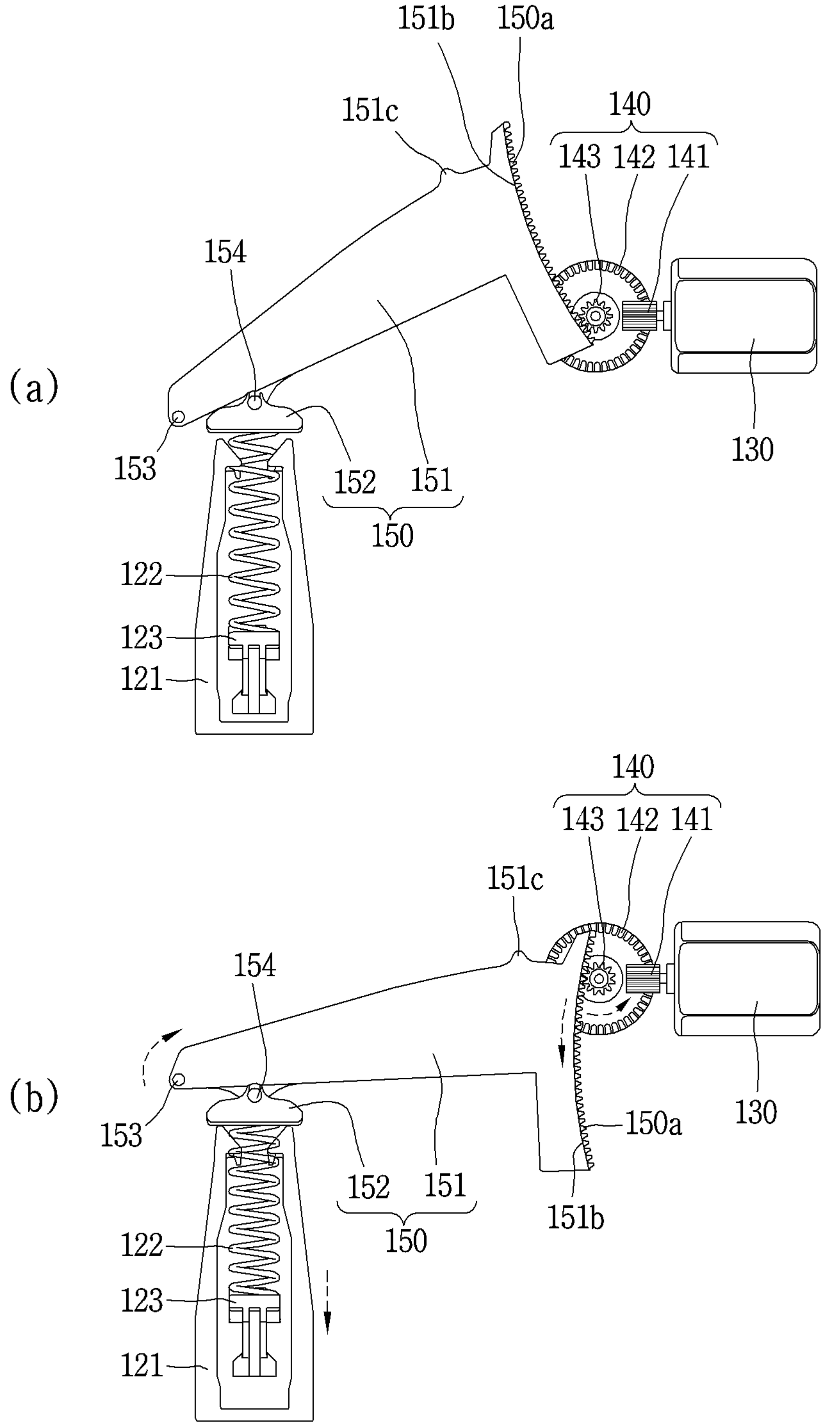
FIG. 8 is a view conceptually showing another example of the drive gear portion illustrated in FIG. 5.

FIG. 8 is a view conceptually showing another example of the drive gear portion 150 illustrated in FIG. 5. (a) of FIG. 8 illustrates a shape before the electric motor 130 operates. That is, (a) of FIG. 8 shows a state before the rotational operation of the drive gear portion 150 occurs. Furthermore, (b) of FIG. 8 shows a shape after the electric motor 130 operates to perform the rotational operation of the drive gear portion 150.

Referring to FIG. 8, the first section 151 of the drive gear portion 150 may include a curved surface portion 151*b* provided on one side of the first section 151 and configured with a curved surface. Here, the curved surface portion 151*b* may be disposed in a concave manner toward the rotation axis 150*b* of the drive gear portion 150, unlike the curved surface portion 151*b* illustrated in FIGS. 6 and 7.

According to the structure of the curved surface portion 151*b* as described above, the drive gear portion 150 may be configured to rotate in one direction by receiving the rotational force generated by the electric motor 130 from the gear portion 140. In addition, as the drive gear portion 150 rotates in one direction, the door 110 may be opened while the hook portion 121 moves out of the door lock portion 120.

On the other hand, when the curved surface portion 151*b* is disposed in a concave manner toward the rotation axis 150*b* of the drive gear portion 150, a volume of the drive gear portion 150 may be implemented to be smaller compared to a structure in which the curved surface portion 151*b* is disposed in a convex manner in a direction away from the rotation axis 150*b* of the drive gear portion 150. As a result, components configured to open the door 110 by pushing the hook portion 121 of the door lock portion 120 out of the door lock portion 120 may be further downsized.

Hereinafter, an operation in which the hook portion 121 illustrated in FIG. 5 moves out of the door lock portion 120 by the drive gear portion 150 to release a locked state of the door 110 will be described with reference to FIGS. 9 and 10.

Figure 9:
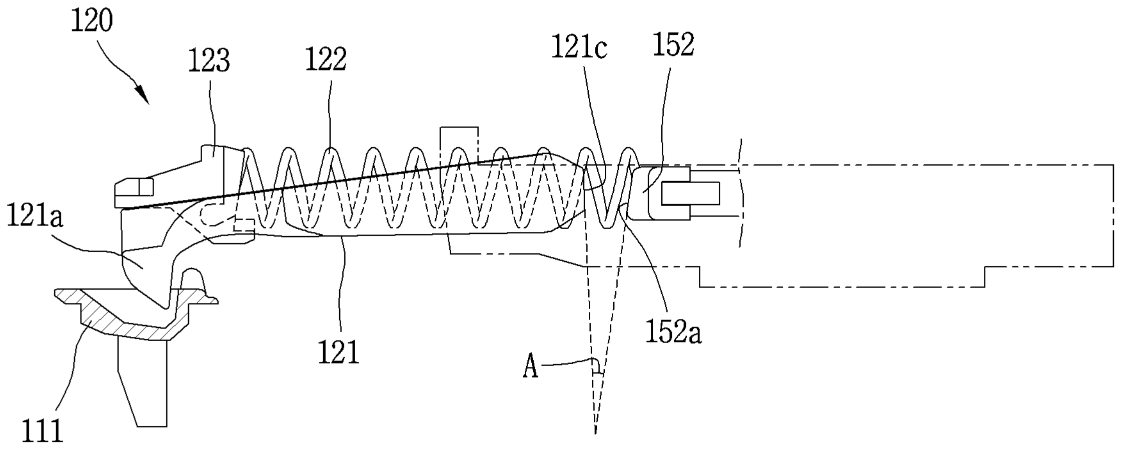
FIG. 9 is a view conceptually showing a shape prior to moving the hook portion illustrated in FIG. 5 out of the door lock portion.
Figure 10:
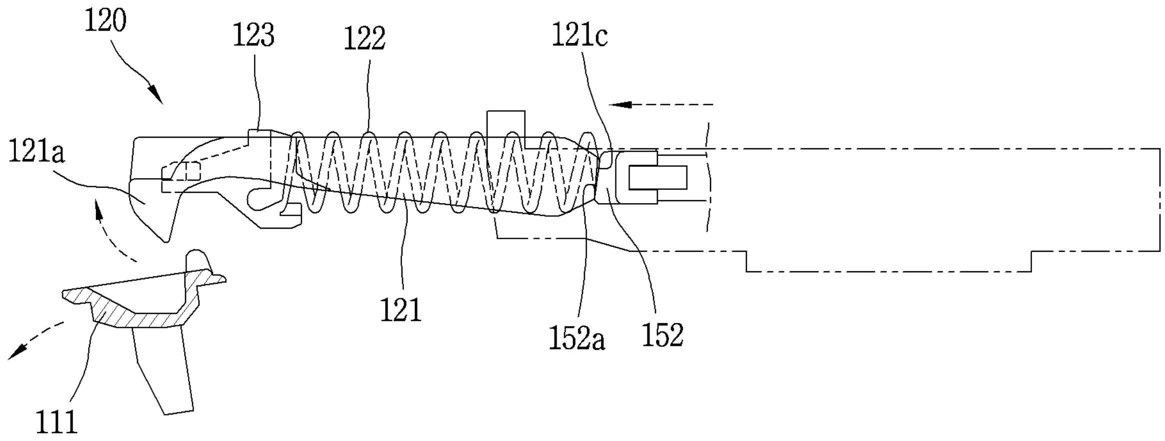
FIG. 10 is a view conceptually showing a shape in which the hook portion illustrated in FIG. 9 is pushed and moved out of the door lock portion by the drive gear portion.

FIG. 9 is a view conceptually showing a shape prior to moving the hook portion 121 illustrated in FIG. 5 out of the door lock portion 120, and FIG. 10 is a view conceptually showing a shape in which the hook portion 121 illustrated in FIG. 9 is pushed and moved out of the door lock portion by the drive gear portion 150.

Referring to FIGS. 9 and 10, the hook portion 121 of the door lock portion 120 and the second section 152 of the drive gear portion 150 may be provided with a first contact surface 121*c* and a second contact surface 152*a*, respectively, which are disposed in contact with each other when the second section 152 moves out of the door lock portion 120 during the operation of the electric motor 130.

Furthermore, as illustrated in FIG. 9, in a state prior to being pushed out of the door lock portion 120 by the second section 152, the hook portion 121 of the door lock portion 120 may be configured such that one end portion provided with the hook engaging portion 121*a* faces lower than the other end portion.

Here, in a state before the second section 152 of the drive gear portion 150 moves out of the door lock portion 120 as illustrated in FIG. 9, the first contact surface 121*c* and the second contact surface 152*a* may be disposed to have an included angle having a predetermined value. Accordingly, when the second section 152 of the drive gear portion 150 moves out of the door lock portion 120 during the operation of the electric motor 130, one end portion of the hook portion 121 may be configured to rotate upward about the other end portion of the hook portion 121.

On the other hand, as electricity is applied to the electric motor 130 to move the second section 152 out of the door lock portion 120, the elastic portion 122 of the door lock portion 120 is compressed, and when electricity supply to the motor 130 is stopped, the elastic portion 122 moves the hook portion 121 into the door lock portion 120 while the other end portion is supported by the support portion 123. At the same time, while one end portion of the hook portion 121 rotates downward again about the other end portion, the hook engaging portion 121*a* and the door engaging portion 111 may be fastened to each other again, and the door 110 may be switched to a closed state.

In addition, as illustrated in FIG. 10, when the hook portion 121 moves out of the door lock portion 120 such that one end portion of the hook portion 121 rotates upward about the other end portion, the door engaging portion 111 engaged with the hook engaging portion 121*a* provided at one end portion of the hook portion 121 is released. When the engagement of the door engaging portion 111 is released, the door 110 may be switched from a closed state to an open state while rotating toward a front of the main body 101 by its own weight about the hinge portion 103. On the other hand, when the user wants to directly open the door 110 of the home appliance 100, in a closed state of the door 110, a force greater than an elastic force of the elastic portion 122 may be applied to the door 110 to open the door 110 by a manipulation of pulling the door 110 in a forward direction of the main body 101.

The foregoing is merely illustrative and various modifications can be made by those skilled in the art without departing from the scope and spirit of the described embodiments. The foregoing embodiments may be implemented individually or in any combination.

INDUSTRIAL APPLICABILITY

The present disclosure may be used in industrial fields related to a home appliance having a door.

What is claimed is:

1. A home appliance comprising:

a door;

a door lock portion that accommodates a hook portion configured to lock and unlock the door;

an electric motor configured to generate a rotational force;

a gear portion configured to rotate based on receiving the rotational force from the electric motor; and a drive gear portion including a toothed portion rotatably coupled to the gear portion, wherein (i) the toothed portion is configured to rotate based on receiving the rotational force from the gear portion, and (ii) the drive gear portion is configured, based on the drive gear portion rotating in a first direction, to push the hook portion out of the door lock portion, wherein the drive gear portion further comprises:

a first section that includes the toothed portion, and a second section rotatably coupled to the first section and disposed between the first section and the hook portion, the second section being configured, based on the first section rotating in the first direction, to push the hook portion out of the door lock portion, wherein the hook portion includes a hook engaging portion provided at one end portion of the hook portion, wherein the door includes a door engaging portion configured to couple to the hook engaging portion, and wherein the door lock portion comprises:

an elastic portion having one end portion coupled to the second section, the elastic portion being configured to be caught by an other end portion of the hook portion to thereby move the hook portion into the door lock portion, and a support portion coupled to an other end portion of the elastic portion and configured to support the other end portion of the elastic portion.

2. The home appliance of claim 1, wherein the toothed portion is provided at one side of the first section, and a rotation axis of the drive gear portion is disposed on an other side of the first section.

3. The home appliance of claim 2, wherein the second section is disposed adjacent to the rotation axis of the drive gear portion.

4. The home appliance of claim 2, wherein the first section includes a curved surface portion provided at one side of the first section, and wherein the toothed portion is provided at the curved surface portion.

5. The home appliance of claim 4, wherein the curved surface portion concavely protrudes toward the rotation axis of the drive gear portion.

6. The home appliance of claim 4, wherein the curved surface portion convexly protrudes in a direction away from the rotation axis of the drive gear portion.

7. The home appliance of claim 1, wherein the gear portion comprises:

a first gear coupled to a shaft constituting a rotation axis of the electric motor;

a second gear coupled to the first gear, and having a rotation axis crossing the rotation axis of the electric motor; and a third gear rotatably coupled to the second gear, the third gear having the same rotation axis as the second gear and being coupled to the toothed portion, wherein a number of teeth of the first gear is smaller than a number of teeth of the second gear, and a number of teeth of the third gear is smaller than the number of teeth of the second gear, and wherein the gear portion is configured to have a smaller number of output rotations of the third gear than a number of input rotations of the first gear to thereby reduce a rotational speed of the shaft.

8. The home appliance of claim 7, wherein a number of rotations of the drive gear portion is less than the number of rotations of the third gear.

9. The home appliance of claim 1, further comprising:

a housing portion configured to accommodate the drive gear portion, wherein the housing portion includes a stopper coupled to the drive gear portion, the stopper being configured to limit a rotational operation of the drive gear portion to a preset position.

10. The home appliance of claim 1, wherein the hook portion and the second section include a first contact surface and a second contact surface, respectively, the first contact surface and the second contact surface being configured, based on the second section moving out of the door lock portion, to be in contact with each other, wherein one end portion of the hook portion is configured to be lower than the other end portion of the hook portion, the first and second contact surfaces being provided at a predetermined angle based on the second section being pushed into the door lock portion, and wherein the one end portion of the hook portion is configured, based on the second section moving out of the door lock portion, to rotate upward.

11. The home appliance of claim 1, wherein the door is (i) rotatably coupled to a main body that has an opening portion on one side thereof and (ii) configured to open and close the opening portion, and wherein the door lock portion is provided at the main body.

12. The home appliance of claim 1, wherein the door is (i) rotatably coupled to a main body that has an opening portion on one side thereof and (ii) configured to open and close the opening portion, and wherein the door lock portion is provided at the door.

13. A home appliance comprising:

a door;

a door lock portion that accommodates a hook portion configured to lock and unlock the door;

an electric motor configured to generate a rotational force;

a gear portion configured to rotate based on receiving the rotational force from the electric motor; and a drive gear portion including a toothed portion rotatably coupled to the gear portion, wherein (i) the toothed portion is configured to rotate based on receiving the rotational force from the gear portion, and (ii) the drive gear portion is configured, based on the drive gear portion rotating in a first direction, to push the hook portion out of the door lock portion, wherein the home appliance further comprises:

a controller configured to control an operation of the electric motor; and a sensing portion configured to detect a movement of the drive gear portion rotating in a second direction opposite the first direction, and wherein the controller is configured, based on the sensing portion detecting the movement of the drive gear portion rotating in the second direction, to operate the electric motor.

* * * * *